(12) United States Patent
Frame et al.

(10) Patent No.: US 6,216,192 B1
(45) Date of Patent: Apr. 10, 2001

(54) DYNAMIC RESOURCE ALLOCATION ACROSS BUS BRIDGES

(75) Inventors: Robert C. Frame, Westboro; Premanand Sakarda, Acton, both of MA (US); Mark Sawyer, Bow, NH (US); Richard Hennessy, Lunenburg, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/107,940

(22) Filed: Jun. 30, 1998

(51) Int. Cl.7 ........................................ G06F 13/00
(52) U.S. Cl. .................................................. 710/129
(58) Field of Search ................................. 710/126, 129, 710/101, 260, 266, 268

(56) References Cited

U.S. PATENT DOCUMENTS 5,596,729 * 1/1997 Lester et al. ......................... 710/128
5,864,688 * 1/1999 Santos et al. ........................ 710/129

* cited by examiner

Primary Examiner—Glenn A. Auve
(74) Attorney, Agent, or Firm—Hamilton, Brook, Smith & Reynolds, P.C.

(57) ABSTRACT

A system and method to permit access requests from a mezzanine bus through different bridges to perform in similar ways in disclosed. The access requests are serviced even if the bridges are configured differently, therefore allowing hardware and software management by allowing software to treat peripheral devices attached to different types of bridges as similar devices. Features of the peripheral devices, therefore, can be more effectively and more fully accessed by evading limitations of the addressing mode for one or more of the bridges.

25 Claims, 3 Drawing Sheets

DYNAMIC RESOURCE ALLOCATION ACROSS BUS BRIDGES

FIELD OF THE INVENTION

This invention relates generally to communication from one bus to another via bus bridges.

BACKGROUND OF THE INVENTION

Many computers now employ a mezzanine bus that allows high speed communication between the processor, memory, and peripheral devices. These computers generally also provide bridges to other, often older, types of buses. Providing these bridges can allow the processor to communicate efficiently with devices employing specialized interfaces, with legacy devices that use older bus interfaces, and with slower or less expensive devices that do not need to communicate at high speeds.

The bridges provided on existing computers do not always use consistent access methods, even when two or more are connected to the same bus. For example, bridges between a PC Interactive (PCI) mezzanine bus and Industry Standard Architecture (ISA) buses can operate in either positive or subtractive modes. In positive mode, the ISA address space is allocated as a portion of the PCI address space, while in subtractive mode, those requests that are not claimed by the PCI bus can be claimed by the ISA bus.

SUMMARY OF THE INVENTION

Systems according to the invention may be advantageous in that they may permit access requests from a mezzanine bus through different bridges to perform in similar ways, even if the bridges are configured differently. This can make the interface between hardware and software more easy to manage by allowing software to treat peripheral devices attached to different types of bridges as similar devices. The invention may also allow a computer to use more of the features of the peripheral devices or to use the peripheral devices more effectively by evading limitations of the addressing mode for one or more of the bridges.

In one general aspect, the invention features a computer system including a processor having a bus port, a mezzanine bus operatively connected to the bus port, a first peripheral bus, a first bridge operatively connected between the mezzanine bus port and the first peripheral bus, and an input/output handler responsive to the mezzanine bus and operative to intercept a subset of bus accesses from the mezzanine bus to the first peripheral bus.

The computer system can include a second peripheral bus, and a second bridge operatively connected between the mezzanine bus and the second peripheral bus, wherein the bridges employ different addressing modes. The first bridge can employ a positive addressing mode and the second bridge can employ a subtractive addressing mode. The input/output handler can be operative to intercept attempts to dynamically adjust resources allocated to devices on the first peripheral bus. The input/output handler can be operative to reprogram the first bridge in response to intercepted accesses on the mezzanine. The mezzanine bus can be a PCI bus and the first peripheral bus can be an ISA bus.

In one general aspect, the invention features a computer system including means for intercepting access attempts of a first type destined for first circuitry, means responsive to the means for intercepting for decoding the access attempts to obtain information about the nature of the access attempts, and means responsive to the means for decoding for reprogramming the first circuitry in response to the access attempts of the first type in conformance with the information obtained by the means for decoding.

The first circuitry can be a bridge and the bus can be a mezzanine bus. The computer system can further include means for passing access attempts of the first type over a second bridge of the same type as the first bridge. The means for intercepting can intercept attempts to allocate or deallocate resources through the bridge. The means for reprogramming can be operative to decline to reprogram the bridge in response to the information in further access attempts.

In another general aspect, the invention features a method of operating a computer. The method includes steps of intercepting access attempts of a first type from a bus destined for first circuitry, decoding the access attempts to obtain information about the nature of the access attempts, and reprogramming the circuitry in response to the access attempts of the first type in conformance with the information in the access attempts obtained in the step of decoding. The bus can be a mezzanine bus and the first circuitry can be a first bridge and the method can further include the step of passing access attempts of the first type over a second bridge of the same type as the first bridge. The step of intercepting can intercept attempts to allocate or deallocate resources through a bridge. The step of intercepting intercepts can attempt to allocate or deallocate resources through a bridge. The bus can be a mezzanine bus and the first circuitry can be a first bridge and the method can further include steps of intercepting further access attempts, decoding the further access attempts, and declining to reprogram the bridge in response to the information in the further access attempts.

In another general aspect, the invention features a computer system including a processor having a bus port, a bus operatively connected to the bus port, a first circuit having programmable access circuitry operatively connected to the bus port, and an input/output handler responsive to the bus and operative to intercept a subset of bus accesses from the bus to the first circuit and operatively connected to the programmable access circuitry of the first circuit.

DETAILED DESCRIPTION OF AN ILLUSTRATIVE EMBODIMENT

Figure 1:
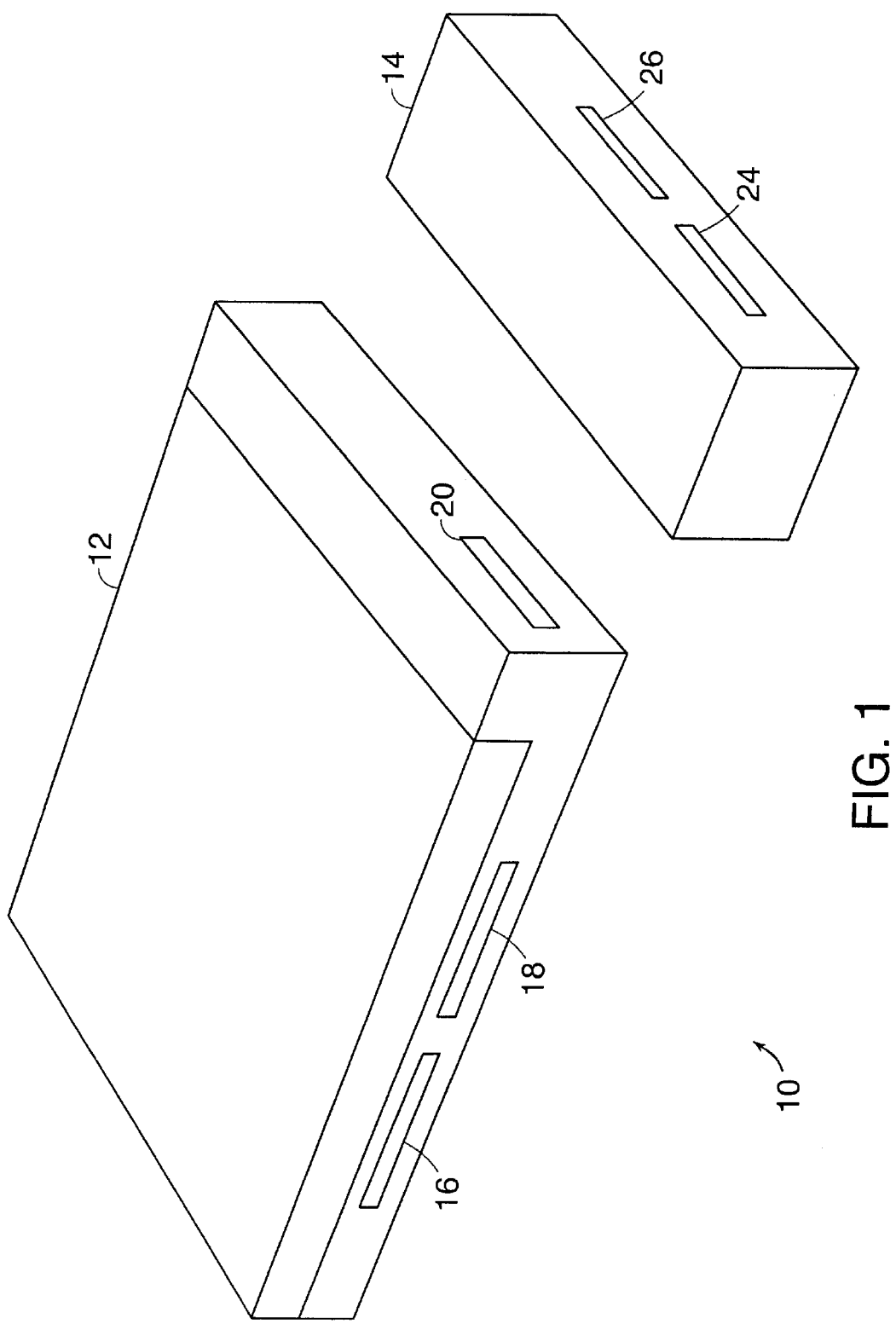
FIG. 1 is a perspective outline drawing of a portable computer according to the invention.

Referring to FIG. 1, a portable computer system 10 according to the invention includes a main computer unit 12 and a docking station 14. The main unit is a self-sufficient, battery-powered computer with a processor, memory, and user interface hardware, such as a keyboard, touch pad, and display screen. The main computer unit also has one or more peripheral interface slots 16, 18. These slots each include a connector that allows a peripheral device, such as a floppy disk drive, network interface, or modem, to be inserted and carried with the computer.

A docking connector 20 is also located on the main computer unit's housing. This connector mates with a corresponding docking connector on the docking interface. The docking interface includes one or more peripheral slots 24, 26, which exhibit a form factor and electrical specification similar to that of the peripheral slots in the main computer unit, so that peripheral devices can be swapped between the main computer unit and the docking station housing.

Figure 2:
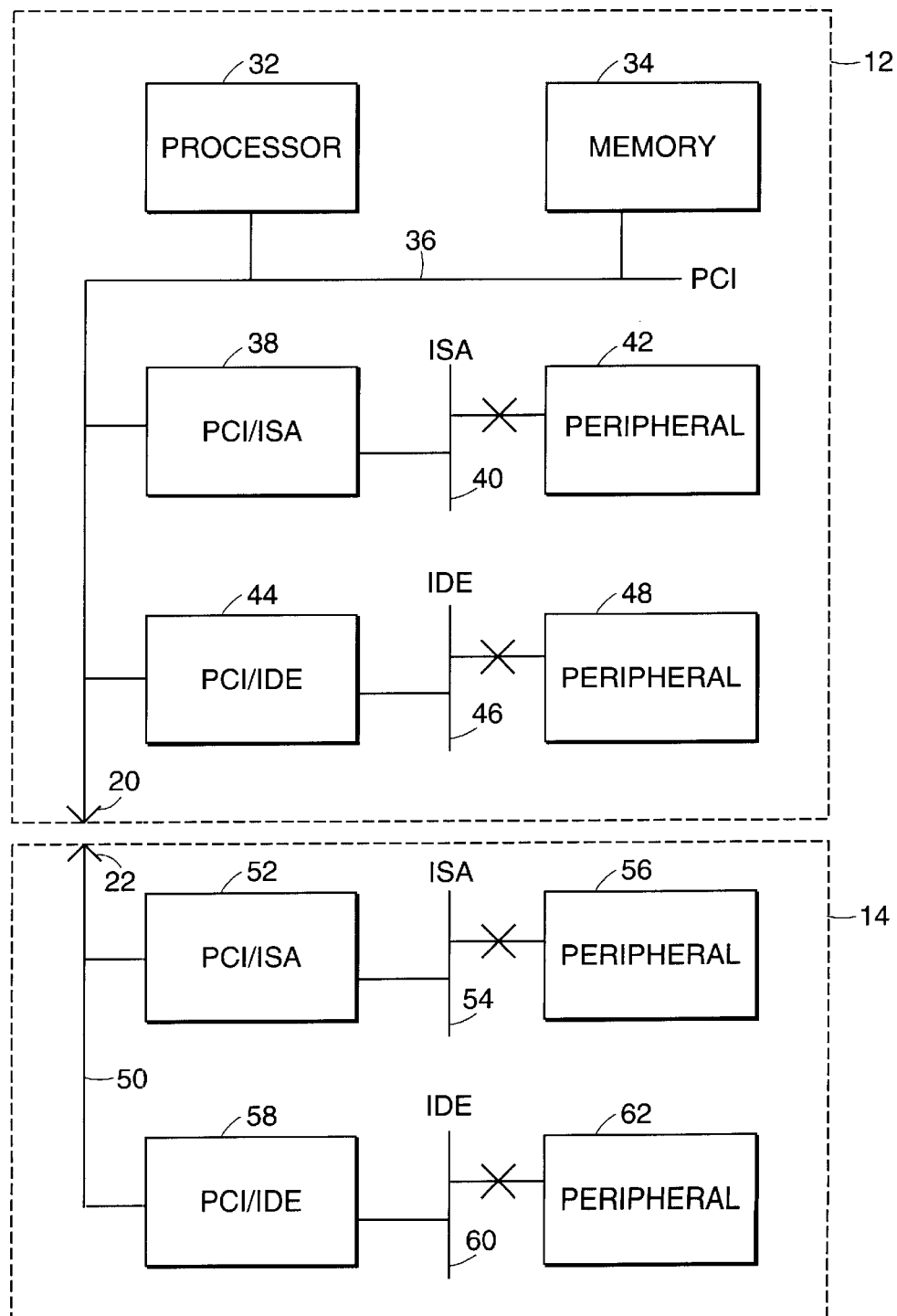
FIG. 2 is a block diagram of the portable computer of FIG. 1.

Referring also to FIG. 2, the main unit 12 includes a processor 32 and memory 34 each having a port operatively connected to a first bus 36. This first bus can be a Peripheral Component Interface (PCI) bus, which is a relatively high-speed mezzanine bus with burst transfer and automatic configuration capabilities.

Also provided in the main computer unit 12 is a first bridge or bus adapter 38, which is operatively connected between the first bus 36 and a second bus 40 and configured in positive decode mode. The second bus can be an Industry Standard Architecture (ISA) bus. The ISA bus is an extension of the IBM-XT bus architecture, which runs at 8 MHz and allows for bus mastering. A first peripheral device 42, such as a PCMCIA controller, can be operatively connected to the second bus via an interface connector in the first of the peripheral interface slots 14.

A second bridge 44 is also operatively connected to the first bus 36 and to one or more interface slot connectors 46. These slots can be so-called CardBus slots, which are 32 bit-small form factor peripheral interface slots. The connector in one or more of the slots can be connected to another peripheral 48, such as a modem or network interface.

The first bus 36 within the main computer unit 12 is also operatively connected to its docking connector 20. This docking connector can mate with its counterpart docking connector 22 on the housing of the docking station 14. The second connector is operatively connected to a first bus 50 within the docking station. This bus can also be a PCI bus.

Figure 3:
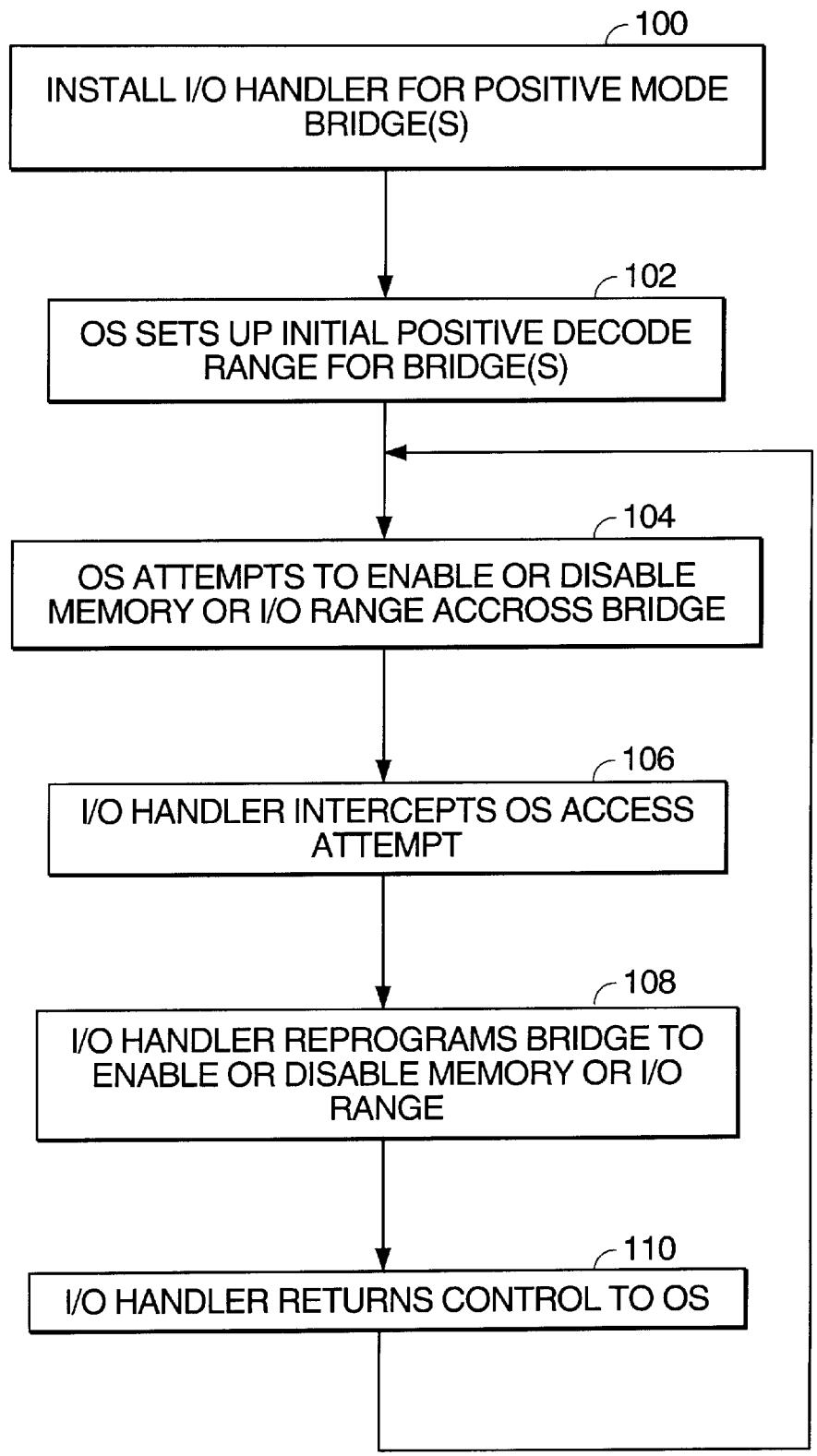
FIG. 3 is a flowchart illustrating the operation of the portable computer of FIG. 1.

A first bridge 52 is connected between the first bus 50 and the second bus 54 and is configured to operate in subtractive decode mode. The second bus can be an ISA bus, and can be operatively connected to a first peripheral 56, such as a floppy drive via an interface connector in a first of the peripheral interface slots 24 in the docking station 14. A second bridge 58 is also connected to the first bus of the docking station and to a second bus 60 of the docking station. This bus can be an Integrated Drive Electronics (IDL) bus that can also be operatively connected to a second peripheral 62 via an interface connector in a second of the peripheral interface slots 26 in the docking station. The IDE bus is a bus based on the ISA bus and designed to handle power and data signal interfaces between a computer and integrated disk controller and drive In operation, referring to FIGS. 1–3, during initial boot-up of the computer 10, the processor will run a boot routine, which is typically stored in a nonvolatile portion of the memory 34. One of the functions the boot routine performs is to install an input/output (I/O) handler for the first bridge 38, which operates in positive mode (step 100). This I/O handler traps I/O addresses destined for the first peripheral device. Also during a boot-up, the initial positive decode range for the bridges is set up (step 104). This can be done by the operating system, either before or after the I/O handler is installed.

Later in the boot routine, or after the boot routine has completed, the operating system may attempt to enable or disable memory or I/O ranges in the ISA peripheral device 42 through the first bridge 38 (step 104). This access will cause the I/O handler to first determine whether the bridge can handle the access attempt properly, such as by testing the address used in the access attempt (step 105). If the I/O handler determines that the bridge cannot handle the access properly, it intercepts the operating system access attempt (step 106) and generate a system-level interrupt. The system-level interrupt will evaluate the operating system access attempt and, if necessary, translate it into commands to be sent to the first bridge to enable or disable the memory or I/O range that the operating system referenced in its attempt to access the first peripheral 42 (step 108). Once the software interrupt has finished reprogramming the bridge, it returns control to the operating system (step 110), so that it can resume ordinary operation (step 112). These steps are repeated for further attempts by the operating system to enable or disable memory or I/O ranges across the bridge.

In one example, the operating system seeks to enable a block of addresses in the first peripheral 42 by sending an enable request to a control register in the device. The I/O handler intercepts this request and decodes it to determine that the access request was a request to enable a particular address range. It then generates a request to enable that address range in the first bridge 38. Note that not all tracked requests need result in reprogramming of the bridge. The I/O handler must first interpret the request to determine if it has a material effect on addressing.

This invention can be applied in a number of situations where a computer operating system is not compatible with another hardware element. For example, the WINDOWS® 95 operating system available from Microsoft cannot adjust memory or I/O ranges across a positively decoded bus bridge. By trapping accesses that would cause undesirable results, testing them, and adjusting the accessed hardware, if necessary, this limitation can be circumvented.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer system, comprising:
a processor having a bus port,
a mezzanine bus having a mezzanine bus port operatively connected to the bus port,
a first peripheral bus,
a first bridge operatively connected between the mezzanine bus port and the first peripheral bus,
an input/output handler responsive to the mezzanine bus and operative to intercept a subset of bus access attempts from the mezzanine bus to the first peripheral bus and further operable to generate an interrupt in response thereto; and
an interrupt handler in the input/output handler responsive to the interrupt and operable to evaluate the subset of bus access attempts to determine if the bus access attempts correspond to the first bridge.

2. The computer system of claim 1 further including a second peripheral bus, and a second bridge operatively connected between the mezzanine bus and the second peripheral bus, wherein the bridges employ different addressing modes.

3. The computer system of claim 2 wherein the first bridge employs a positive addressing mode and the second bridge employs a subtractive addressing mode.

4. The computer system of claim 3 wherein the input/output handler is operative to intercept attempts to dynamically adjust resources allocated to devices on the first peripheral bus.

5. The computer system of claim 4 wherein the input/output handler is operative to reprogram the first bridge in response to intercepted accesses on the mezzanine bus.

6. The computer system of claim 3 wherein the input/output handler is operative to reprogram the first bridge in response to intercepted accesses on the mezzanine bus.

7. The computer system of claim 3 wherein the mezzanine bus is a PCI bus and the first peripheral bus is an ISA bus.

8. The computer system of claim 2 wherein the mezzanine bus is a PCI bus and the first peripheral bus is an ISA bus.

9. The computer system of claim 2 wherein the input/output handler is operative to intercept attempts to dynamically adjust resources allocated to devices on the first peripheral bus.

10. The computer system of claim 2 wherein the input/output handler is operative to reprogram the first bridge in response to intercepted accesses on the mezzanine bus.

11. The computer system of claim 10 wherein the input/output handler is operative to intercept attempts to dynamically adjust resources allocated to devices on the first peripheral bus.

12. The computer system of claim 1 wherein the input/output handler is operative to intercept attempts to dynamically adjust resources allocated to devices on the first peripheral bus.

13. The computer system of claim 12 wherein the input/output handler is operative to reprogram the first bridge in response to intercepted accesses on the mezzanine bus.

14. A computer, comprising:
  means for intercepting access attempts to a bus of a first type destined for first circuitry,
  means responsive to the means for intercepting for decoding the access attempts to obtain information about a nature of the access attempts, wherein the means responsive to the means for intercepting is operable to generate an interrupt in response to the nature of the access attempts; and
  means responsive to the means for decoding for reprogramming the first circuitry in response to the access attempts of the first type in conformance with the information obtained by the means for decoding, wherein the means responsive is responsive to the interrupt and operable to evaluate the subset of access attempts to determine if the bus access attempts correspond to the first bridge.

15. The computer of claim 14 wherein the first circuitry is a first bridge and wherein the bus is a mezzanine bus.

16. The computer of claim 15 further including means for passing access attempts of the first type over a second bridge of the same type as the first bridge.

17. The computer of claim 16 wherein the means for intercepting intercepts attempts to allocate or deallocate resources through the first bridge.

18. The computer of claim 15 wherein the means for intercepting intercepts attempts to allocate or deallocate resources through the bridge.

19. The computer of claim 15 further wherein the means for reprogramming is operative to decline to reprogram the bridge in response to the information in further access attempts.

20. A method of operating a computer, comprising:
  intercepting access attempts of a first type from a bus destined for first circuitry,
  decoding the access attempts to obtain information about a nature of the access attempts,
  generating an interrupt in response to the nature of the access attempts, and
  reprogramming the circuitry in response to the access attempts of the first type in conformance with the information in the access attempts obtained in the step of decoding, wherein the reprogramming is in response to the interrupt and further includes evaluating the access attempts to determine if the access attempts correspond to the first bridge.

21. The method of claim 20 wherein the bus is a mezzanine bus and the first circuitry is a first bridge and further including the step of passing access attempts of the first type over a second bridge of the same type as the first bridge.

22. The method of claim 21 wherein the step of intercepting intercepts attempts to allocate or deallocate resources through a bridge.

23. The method of claim 20 wherein the step of intercepting intercepts attempts to allocate or deallocate resources through a bridge.

24. The method of claim 20 wherein the bus is a mezzanine bus and the first circuitry is a first bridge and further including the step of intercepting further access attempts, decoding the further access attempts, and declining to reprogram the bridge in response to the information in the further access attempts.

25. A computer system, comprising:
  a processor having a bus port,
  a bus operatively connected to the bus port,
  a first circuit having programmable access circuitry operatively connected to the bus port, and
  an input/output handler responsive to the bus and operative to the intercept a subset of bus access attempts from the bus to the first circuit and operatively connected to the programmable access circuitry of the first circuit and further operable to generate an interrupt in response thereto; and
  an interrupt handler in the input/output handler responsive to the interrupt and operable to evaluate the subset of bus access attempts to determine if the bus access attempts correspond to the first bridge.

* * * * *